US012306663B2

(12) United States Patent
Boettjer et al.

(10) Patent No.: US 12,306,663 B2
(45) Date of Patent: May 20, 2025

(54) SYSTEMS, METHODS AND APPARATUS FOR SYNCHRONIZATION OF MULTIPLE PROCESSING DEVICES

(71) Applicant: The Boeing Company, Arlington, VA (US)

(72) Inventors: Bruce A. Boettjer, Arlington, VA (US); Dennis Kanarsky, Arlington, VA (US); Douglas M. McIntosh, Arlington, VA (US); Hyunsuk Shin, Arlington, VA (US); Forrest B. Lee, Arlington, VA (US); Robert Horton, Arlington, VA (US)

(73) Assignee: The Boeing Company, Arlington, VA (US)

( * ) Notice: Subject to any disclaimer, the term of this patent is extended or adjusted under 35 U.S.C. 154(b) by 110 days.

(21) Appl. No.: 18/189,963

(22) Filed: Mar. 24, 2023

(65) Prior Publication Data

US 2024/0319763 A1    Sep. 26, 2024

(51) Int. Cl.
*G06F 1/12*    (2006.01)
(52) U.S. Cl.
CPC ..................................... *G06F 1/12* (2013.01)

(58) Field of Classification Search
CPC ...... G06F 11/187; G06F 9/30087; G06F 9/52; G06F 9/522; G06F 9/3834; G06F 11/183; G06F 11/184; G06F 11/185
See application file for complete search history.

(56) References Cited

U.S. PATENT DOCUMENTS

| | | | | |
|---|---|---|---|---|
| 5,226,152 A | * | 7/1993 | Klug | G06F 11/1683 714/5.11 |
| 2020/0310887 A1 | * | 10/2020 | Eckelmann-Wendt | G06F 15/82 |
| 2021/0286623 A1 | * | 9/2021 | Navon | G06F 11/0727 |

* cited by examiner

*Primary Examiner* — Jaweed A Abbaszadeh
*Assistant Examiner* — Brynne J. Corcoran
(74) *Attorney, Agent, or Firm* — Yee & Associates, P.C.

(57) ABSTRACT

The present application relates to systems, methods, and apparatus for synchronization of multiple processing devices. An exemplary system may include a memory device configured to store instructions and data for processing devices. A voting integrated circuit may be coupled to the memory device. The voting integrated circuit may be configured to receive output data from each of a plurality of processing devices and to perform voting between the output data to determine whether a plurality of output data is identical. The voting integrated circuit may be implemented using a field programmable gate array (FPGA).

20 Claims, 5 Drawing Sheets

SYSTEMS, METHODS AND APPARATUS FOR SYNCHRONIZATION OF MULTIPLE PROCESSING DEVICES

FIELD

The present disclosure generally relates to computer systems, and more particularly, to fault or upset tolerant computer systems for synchronization of multiple processing devices.

BACKGROUND

This background description is provided for the purpose of generally presenting the context of the disclosure. Unless otherwise indicated herein, material described in this section is neither expressly nor impliedly admitted to be prior art to the present disclosure or the appended claims.

The natural radiation environment on earth and in space may often cause short term and long term degradation of semiconductor devices used in computer systems. This hazard may be a problem for computer systems where fault-free operation may be required. In addition to these radiation effects, computer systems may be subject to random failures due to undetected defects and weaknesses that evolve over the course of time. Trace radioactive materials in semiconductor packages may also cause faults.

When computer systems must operate for long periods in a remote environment, or where these systems must operate without faults for long periods of time, the need for systems that are protected from faults or errors becomes critical. Systems that operate in earth orbit and beyond are especially vulnerable to this radiation hazard.

The presence of cosmic rays and particularly high-energy particles in space may cause serious threats to computer systems or memory components, such as a single event effect ("SEE") or a single event upset (SEU) of memory. For example, when high-energy particles penetrate a semiconductor device, they may deposit charges within the device or circuits and may create transients and/or noise. This phenomenon can "upset" memory circuits and/or embedded storage elements. One type of upset occurs when a single bit of data stored in a memory of a semiconductor device changes its value due to radiation. For example, a logical value of "one" may change to a logical value of "zero" and vice versa. An upset may be generally defined as a misstated output of a component. This output may comprise one or more signal bits.

The number and susceptibility of memory or storage elements to upsets drives computer transient fault rates. The upset rate of computer systems may be dominated by unprotected main memory. Upsets in the main memory can be protected by error correction codes (ECC) stored in added memory components. Once this effective technique is employed, the processing devices and associated "backside" caches may become the predominant source of upsets.

Traditional approaches to improve data reliability of processing or memory devices attempt to prevent upsets or faults by design improvements, improved component quality, and/or component shielding from environmental effects by radiation hardening. Radiation hardened devices, however, tend to be much more expensive and slower than conventional semiconductor devices. Further, these devices typically lag the state-of-the-art by several years.

In some cases, redundancy, at the computer level, may be used to improve system reliability as well. For example, redundant hardware configurations may utilize multiple processors in a clock-lock-step configuration that is custom designed and costly. These hardware configurations usually utilize lock-step computing in parallel and are designed with especially hardened circuits (i.e., hardware). Typically, this hardware is implemented as one or more application specific integrated circuits ("ASICs") with expensive low volume yields (i.e., very few are produced since the ASICs are custom designed and produced for specific uses). Moreover, these ASICs are typically designed to be free of design errors, unintended features, or both and must be verified and validated to that effect, which further increases the cost of production of the ASICs. Accordingly, there is a need for a computing system having synchronized processing devices that are capable of detecting upsets or faults and preventing their propagation through the system without significantly degrading the computational performance provided by unprotected and non-custom hardware.

SUMMARY

The present application is directed to embodiments that relate to systems, methods, and apparatus for synchronization of multiple processing devices. The embodiments may synchronize the multiple processing devices based on transactions or operations performed by the processing devices. For example, each of the processing devices may independently execute the same instructions of an application program substantially in parallel with the other processing devices to perform operations or transactions. The processing devices may be synchronized or aligned based on the transactions or operations performed by the processing devices. For example, the processing devices may be synchronized or aligned to the outputs produced by the processing devices on a transaction by transaction basis.

Further, the embodiments may be configured to verify or validate the outputs of multiple processing devices to increase data reliability and to reduce the probability of failures. The embodiments may reliably determine and mitigate the effects of upsets or faults occurring in the outputs of the multiple processing devices. For example, the embodiments may using voting techniques to provide a consensus output or result accordingly to the outputs received from the multiple processing devices. As a result, the embodiments may allow the processing devices to continue to operate upon the occurrence of upsets or faults and may prevent the faults from propagating through electronic systems. As such, the embodiments may shield computer memory and/or I/O devices from upsets or faults occurring in the output of the processing devices. Further, the embodiments may allow for the use of commercial, non-radiation hardened components in high radiation environments.

In one aspect, the present application discloses a system. The system may include a memory device configured to store instructions and data for processing devices. A voting integrated circuit may be coupled to the memory device. The voting integrated circuit may be configured to receive output data from each of a plurality of processing devices and to perform voting between the output data to determine whether a plurality of output data is identical. The voting integrated circuit may be implemented using a field programmable gate array (FPGA).

In another aspect, the present application discloses a method. The method may include executing, by a processing core in each of a plurality of processing devices, one or more instructions, wherein each of the processing cores generates output data based on independently executing the one or more instructions. The method may also include receiving, at a voting integrated circuit, the output data from each of the processing cores of the plurality of processing devices. Further, the method may include performing, at the voting integrated circuit, voting between the output data received from each of the processing cores to determine whether a plurality of the output data is identical.

In still another aspect, a non-transitory computer-readable medium having stored thereon instructions is disclosed. The instructions may be executable by a plurality of processing devices to perform operations. The operations may include generating output data for each of the plurality of processing device based on the execution of one or more instructions. The operations may also include performing a voting process between the output data. Further, the operations may include producing a result, based on the voting process, when a majority of the output data of the plurality of processing devices is identical.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers may refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
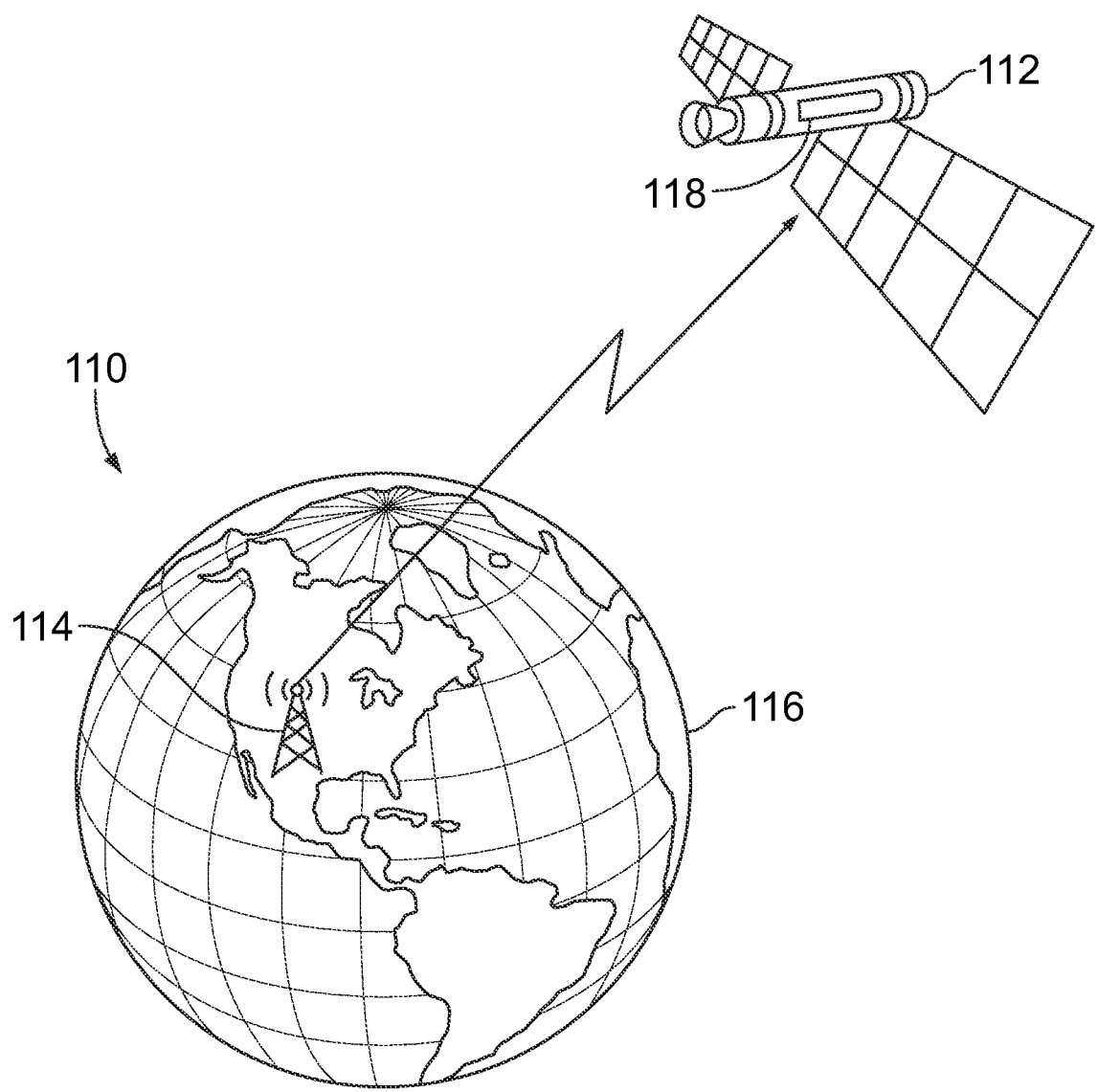
FIG. 1 illustrates a space system including a fault tolerant processing system, according to an exemplary embodiment.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features may be designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, processing devices are illustrated and associated with reference number 210. When referring to a particular one of the processing devices, such as the processing device 210a, the distinguishing letter "a" is used. However, when referring to any arbitrary one of the processing devices or to the processing device as a group, the reference number 210 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Referring now to the drawings, and more particularly to FIG. 1, a space system 110 in accordance with an exemplary embodiment is illustrated. As shown in FIG. 1, the space system 110 may include a satellite system 112 in communication with a ground station 114 located on earth 116. The satellite system 112 may comprise a spacecraft, a satellite, or an aerospace vehicle, such as an aircraft (both manned and unmanned) or a land-based vehicle traveling at a high altitude. The satellite system 112 may contain one or more fault or upset tolerant computing systems 118 (e.g., redundant or high integrity computing systems) for processing data. In operation, the fault tolerant computing system 118 may be part of, for example, a control or navigation system or other system that controls functions of the satellite system 112.

The fault tolerant computing systems 118 of the satellite system 112 may be configured to verify or validate the outputs of processing devices while the spacecraft system operates in high radiation environments. As described above, integrated circuits used in computing systems and other electronic systems aboard space systems are susceptible to a phenomenon known as single event upsets (SEU). Single event upsets may occur when radiation, passing through an integrated circuit, deposits stray charges in the computing system, causing one of its registers or memory elements to be disrupted. Several traditional fault prevention techniques may be utilized to reduce the number of SEUs that occur in the integrated circuits used aboard space systems, but these conventional techniques have several disadvantages as discussed above.

Figure 2:
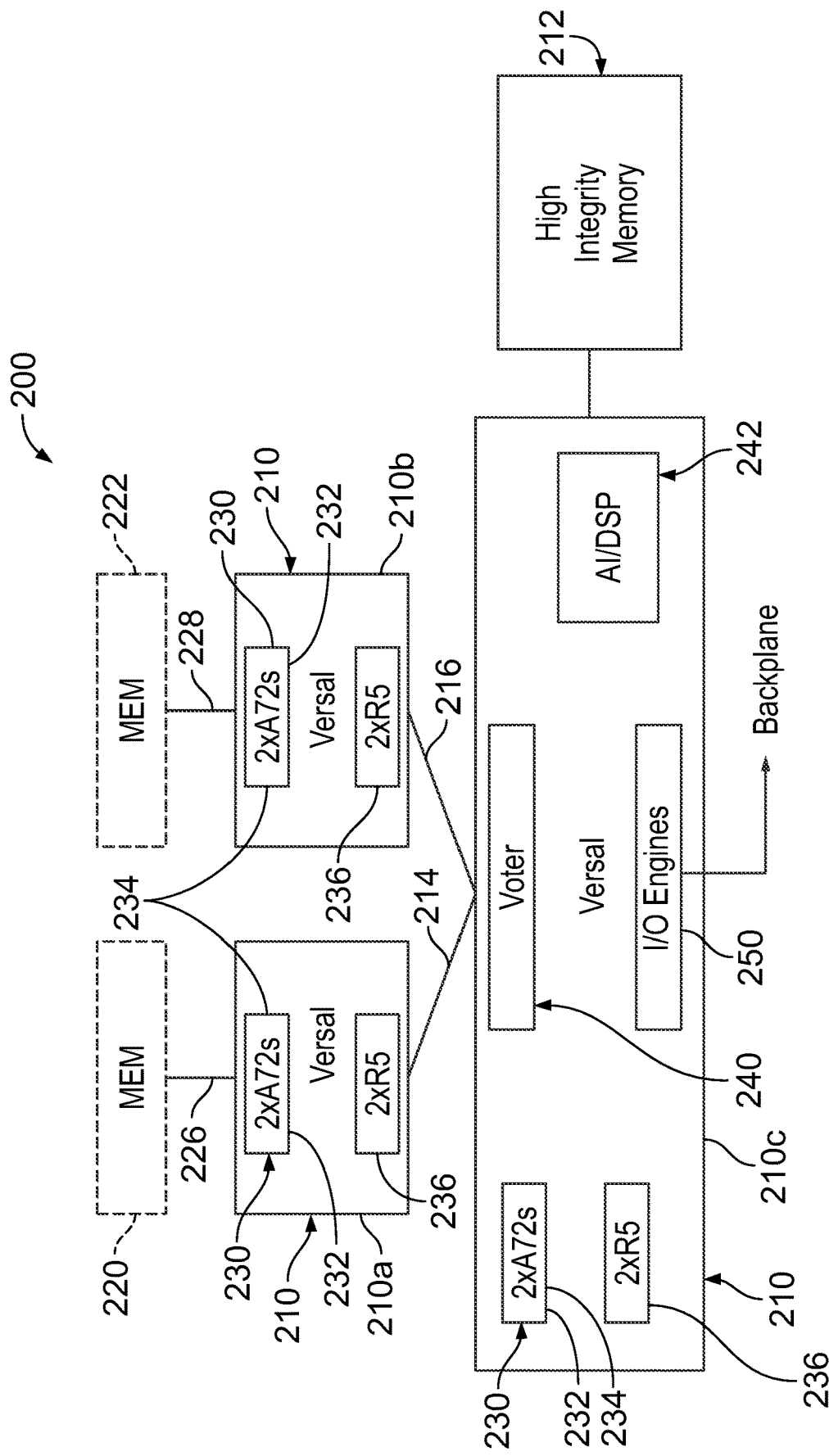
FIG. 2 illustrates a simplified block diagram of a fault tolerant processing system, according to an exemplary embodiment.

Referring to FIG. 2, a block diagram of an exemplary embodiment of a fault or upset tolerant computing system 200 (e.g., a redundant or high data integrity computing system) is illustrated. The fault tolerant computing system 200 may be configured for use in a space system (not shown), such as a spacecraft, a satellite, or other space or aerospace based system. The fault tolerant computing system 200 may be part of a control or navigation system that controls the functions and/or the operations of one or more computing systems of the space system. The fault tolerant computing system 200 may be configured to verify or validate the outputs of processing devices. For example, the fault tolerant computing system 200 may be designed to determine or detect the occurrence of "upsets" (e.g., single event upsets (SEU)) or faults occurring in the outputs of processing devices and prevent the upsets or faults from propagating through the electronic systems of a space system. Such upsets or faults may occur when high energy particles, such as radiation from cosmetic rays, pass through the fault tolerant computing system 200 and cause upsets or faults in memory or storage elements of processing and/or memory devices. Such upsets may change data (e.g., one or more bits) in the memory or processing devices, causing possible malfunctions or failures of the fault tolerant computing system 200 and/or other associated systems.

The fault tolerant computing system 200 may be configured to use redundant computing techniques to improve data reliably of processing devices. As shown in FIG. 2, the fault tolerant computing system 200 may include a plurality of processing devices 210 and a memory device 212. The memory device 212 may be configured to store data to be shared by the processing devices 210. For example, the memory device 212 may store instructions of software applications for execution by the processing devices 210. For example, the processing devices 210 may execute the same instructions of a software application stored in the memory device 212. The software application may have its own memory space and its own dedicated time slot allocated by a scheduler. Further, the processing devices 210 may be configured to access data stored in the memory device 212 and to store data generated by the processing devices 210 in the memory device 212. For example, the processing devices 210 may read data from the memory device 212 and write data to the memory device 212.

As shown in FIG. 2, the fault tolerant computing system 200 includes three processing devices 210, however, one skilled in the art would recognize that any number of processing devices greater than three may be used. In other embodiments, two processing devices may be used to verify or validate the outputs of the processing devices. As shown, the processing device 210a is in communication with the processing device 210c, and the processing device 210b is in communication with the processing device 210c. The processing device 210a may be coupled to the processing device 210c by a communication bus 214, and the processing device 210b may be coupled to processing device 210c by a communication bus 216. Each communication bus 214 and 216 may include, but is not necessarily limited to, a peripheral component interconnect express (PCIe) bus or link. The PCIe link may have a plurality of lanes. In some embodiments, the PCIe may have four (4) lanes with redundant controllers.

The processing devices 210 may be commercially available semiconductor devices that may reduce the overall cost of implementing the fault tolerant computing system 200. Each of the processing devices 210 may be implemented using a VERSAL™ adaptive compute acceleration platform (ACAP). The VERSAL™ ACAP may include scalar engines (processing or computing cores), adaptable engines (programmable logic (e.g., field programmable gate arrays (FPGAs)) and memory cells), intelligent engines (configurable artificial intelligence (AI) and digital signal processing (DSP) engines), and high-speed input/output (I/O) devices that may selectively be connected together with a configurable high-bandwidth network-on-chip (NoC). The VERSAL™ ACAP may be configured to implement the functionality associated with a "system-on-chip" (SoC) or "system-in-package" (SiP).

Figure 3:
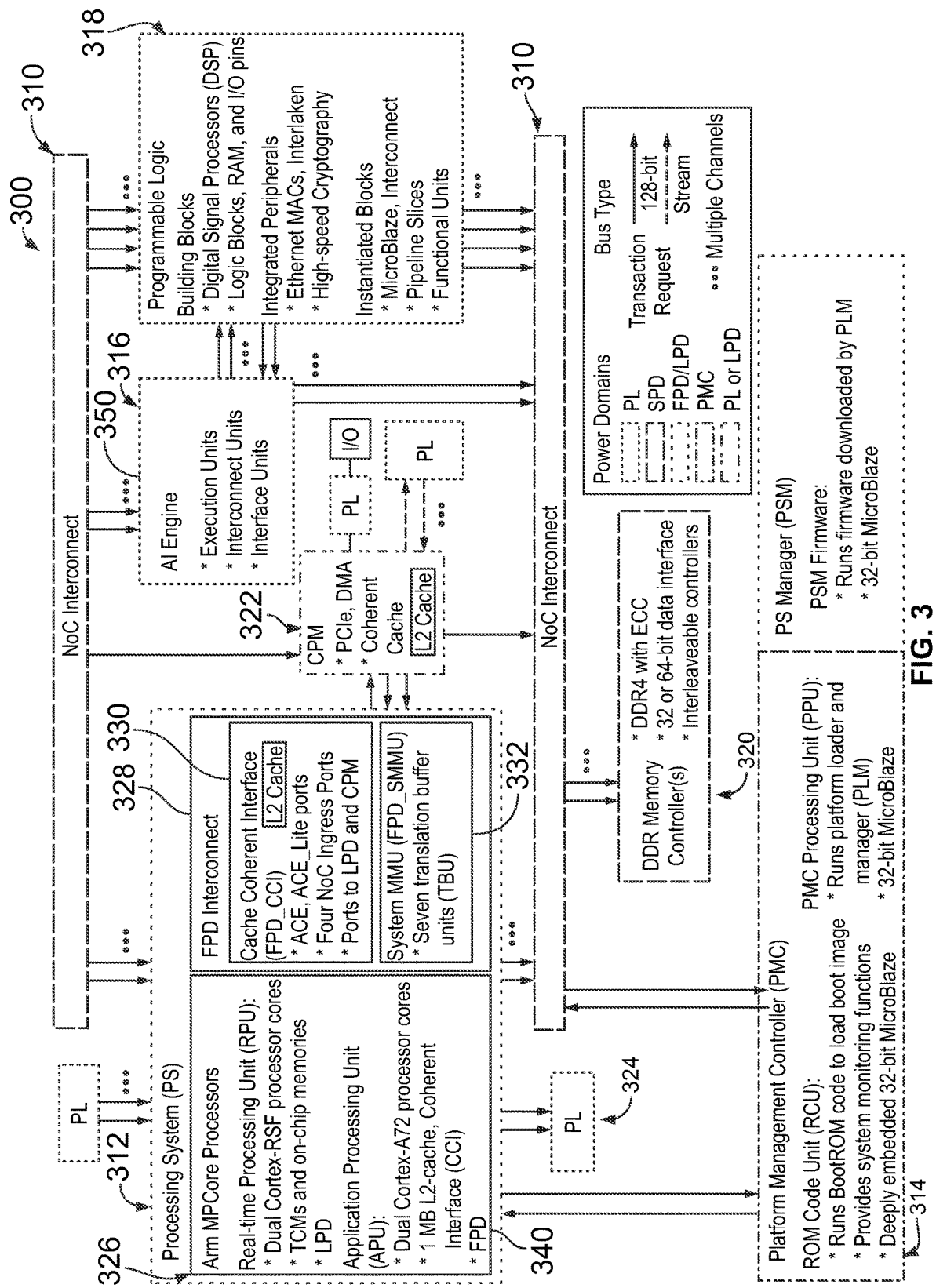
FIG. 3 illustrates a simplified block diagram of the architecture of a processing device, according to an exemplary embodiment.

An exemplary block diagram of an embodiment of the architecture of a processing device 300 is shown in FIG. 3. In some embodiments, the architecture of the processing devices 210a and 210b of FIG. 2 may be substantially similar to architecture of the processing device 300. Note that FIG. 3 is intended to illustrate only one possible example of a processing device. In other implementations, the processing device 300 may include different numbers of logic blocks as well as other types of blocks including input/output blocks, memory controller blocks, transceiver blocks, and the like.

As shown in FIG. 3, the processing device 300 may include a network-on-chip (NoC) interconnect system 310, a processing system 312, a platform management controller (PMC) 314, intelligent engines 316, adaptable engines 318, a double data rate (DDR) memory controller 320, a cache coherent interconnect (CPM) 322, and programming logic (PL) 324. The processing system 312 may include scalar engines 326 and a full-power domain (FPD) interconnect 328. The FPD interconnect 328 may include a cache coherent interconnect (CCI) 330 and a system memory management unit (SMMU) 332. In some implementations, the processing device 300 may be configured to implement the functionality associated with a system-on-a-chip (SoC).

The NoC interconnect system 310 of the processing device 300 may include a number of segments connected together to implement a high-speed, high-bandwidth programmable signal routing network that can selectively interconnect various device resources (such as, the processing system 312, the PMC 314, the intelligent engines 316, the adaptable engines 318, the DDR memory controller 320, and the CPM 322) with each other and with other components not shown for simplicity. The NoC interconnect system 310 may exchange signals and data directly between any of the connected blocks, engines, resources, etc., without any intervening circuits or interfaces. The NoC interconnect system 310 may be configured to transmit information between various device resources as data packets that can be individually addressed and routed from a source location to a destination location. In some aspects, the data packets transmitted on the NoC interconnect system 310 may be dynamically addressable.

The scalar engines 326 of the processing device 300 may include one or more processor cores 340. The processor cores 340 may be configured to perform any number of processing tasks including numeric and/or procedural processing tasks. In some embodiments, the processor cores 340 may include Advanced RISC Machine (ARM) cores, however other processor cores are possible. For example, the processor cores 340 may include a dual-core ARM cortex A72 Application Processing Unit (APU) and a dual core ARM cortex R5F Real-time Processing Unit (RPU). The RPU may be configured as a single/dual processor in lockstep mode.

The intelligent engines 316 of the processing device 300 may include one or more artificial intelligence (AI) engines 350. In other embodiments, the intelligent engines 316 may also include one or more of DSP engines (not shown). The AI engines 350 may include any suitable number of AI inference engines that may be configured to perform any number of machine learning tasks. The DSP engines may include any suitable number of DSP processing cores that may be configured to perform any number of DSP tasks.

The adaptable engines 318 of the processing device 300 may include programmable logic cells and memory cells. The programmable cells and memory cells may be configured to implement programmable logic and/or FPGA designs as well as to form customized memory hierarchies for use within the processing device 300.

The PMC 314 of the processing device 300 may include a local controller (sometimes referred to as a root controller or root monitor, not shown for simplicity) to control operations of the processing device 300. Thus, the PMC 314 may include a configuration interface to receive a configuration bit stream and accordingly configure controlling registers within the processing device 300. The local controller may also control operations of an analog signal controller.

The DDR memory controller 320 of the processing device 300 may enable storage and retrieval of data for the processing device 300. In some implementations, the DDR memory controller 320 may interface with and control DDR memory circuits (not shown for simplicity). The PL 324 of the processing device 300 may provide signal connections with one or more other devices or chips (not shown for simplicity) connected to the processing device 300. In some implementations, the PL 324 may include one or more circuits to enable high-speed data transfer to and from the processing device 300. By way of example and not limitation, the PL 324 may include one or more PCIe interfaces that interface with other processing devices, such as the processing device 210c of FIG. 2, via a PCIe link (not shown).

Referring again to FIG. 2, the processing device 210a may be coupled to a local or cache memory 220 that may be only accessible to the processing device 210a, and the processing device 210b may be coupled to a local or cache memory 222 that may only be accessible to the processing device 210b. The local memories 220 and 222 may be optional memories but may be used to store data so future requests for that data may be served faster. In some embodiments, the data stored in the local memories 220 and 222 may be the result of earlier computation data or duplicate data stored elsewhere. Each of the local memories 220 and 222 may be a random access memory ("RAM"). As shown in FIG. 2, the local memory 220 may be in direct communication with the processing device 220a via a communication bus 226, and the local memory 222 may be in direct communication with the processing device 220b via a communication bus 228. In some embodiments, the local memories 220 and 222 may be integrated directly in the processing devices 210a and 210b, respectively.

As shown in FIG. 2, each of the processing devices 210 may include one or more processing engines 230. The processing engines 230 may include one or more processing cores 232. As shown, the processing engines 230 include a first processing core 234 and a second processing core 236. In some embodiments, the processing engines 230 may include a first dual core processing device and a second, different dual core processing device. The first dual core processing device may be configured as two independent processors and the second dual core processing device may be configured as two independent processors. In some embodiments, the first processing core 234 may include a dual-core ARM cortex A72 Application Processing Unit (APU) and the second processing core 236 may include a dual core ARM cortex R5F Real-time Processing Unit (RPU). The RPU can be configured as a single/dual processor in lockstep mode.

Each of the first processing cores 234 of the processing devices 210 may have a separate and internal clock and may operate independently and asynchronously from the other first processing cores 234. The first processing cores 234 may perform one or more redundant operations or transactions in which each of the first processing cores 234 may be configured to execute the same or redundant instructions (e.g., lockstep instructions) or perform the same data process. For redundant operations or transactions, the first processing cores 234 may execute the same redundant instructions or program based on the same operand data. In some embodiments, the first processing cores 234 may perform redundant operations or transactions substantially in parallel with each other on a transactional lockstep basis as further described below.

The first processing cores 234 of the processing devices 210 may each generate an output based on the execution of the redundant instructions (e.g., lockstep instructions) which may be comprised of single or multiple operations or transactions performed by the processing devices 210. For example, the first processing cores 234 may each produce an output after performing one or more redundant operations or transactions. The first processing cores 234 may perform the redundant operations or transactions in a manner intended to produce matching outputs on a transaction lockstep basis for voting and/or comparison purposes as further described below.

Although the redundant operations or transactions are intended to be performed by the first processing cores 234 simultaneously or substantially in parallel with each other, the first processing cores 234 may perform the redundant operations or transactions at different speeds. For example, the first processing cores 234 may operate faster or slower relative to one another such that the outputs based on the redundant operations or transactions performed by the first processing cores 234 may not be outputted at the same time. As such, the first processing cores 234 may start executing the same instructions at about the same time, but may not provide the outputs at the same time with respect to each other. As a result, the first processing cores 234 may produce outputs at different times, resulting in a time difference between the fastest and slowest output. The first processing cores 234 may be synchronized or aligned based on the transactions or operations performed by the first processing cores 234 as further described below. For example, the first processing cores 234 may be synchronized or aligned to each of the redundant transactions or operations on a lock step basis to minimize the drift between the processing cores 234. Thus, the first processing cores 234 may wait or stall until each first processing core 234 has produced an output before proceeding to the next redundant operation or transaction.

Similarly, each of the second processing cores 236 of the processing devices 210 may have a separate and internal clock and may operate independently and asynchronously from the other second processing cores 236. The second processing cores 236 may perform one or more redundant operations or transactions in which each of the second processing cores 236 may be configured to execute the same or redundant instructions (e.g., lockstep instructions) or perform the same data process. For redundant operations or transactions, the second processing cores 236 may execute the same redundant instructions or program based on the same operand data. In some embodiments, the second processing cores 236 may perform the redundant operations or transactions substantially in parallel with each other on a transactional lockstep basis as further described below.

The second processing cores 236 of the processing devices 210 may each generate an output based on the execution of the reductant instructions (e.g., lockstep instructions) which may be comprised of single or multiple operations or transactions. For example, the second processing cores 236 may each produce an output after performing one or more redundant operations or transactions. The second processing cores 236 may perform the redundant operations or transactions in a manner intended to produce matching outputs on a transaction lockstep basis for voting and/or comparison purposes as further described below. In some embodiments, the second processing cores 236 may be configured to operate in clock-lock-step.

Although the redundant operations or transactions are intended to be performed by the second processing cores 236 simultaneously or substantially in parallel with each other, the second processing cores 236 may perform the redundant operations or transactions at different speeds. For example, the second processing cores 236 may operate faster or slower relative to one another such that the outputs based on each of the redundant operations or transactions performed by the second processing cores 236 may not be outputted at the same time. As such, the second processing cores 236 may start executing the same instructions at about the same time, but may not provide the outputs at the same time with respect to each other. As a result, the second processing cores 236 may produce outputs at different times, resulting in a time difference between the fastest and slowest output. The second processing cores 236 may be synchronized or aligned based on the transactions or operations performed by the second processing cores 236 as further described below. For example, the second processing cores 236 may be synchronized or aligned to each redundant transaction or operation on a lock step basis to minimize the drift between the second processing cores 236. Thus, the second processing cores 236 may wait or stall until each of second processing cores 236 has produced an output before proceeding to the next redundant operations or transactions.

As shown in FIG. 2, the processing device 210*c* includes voting logic 240 (e.g., a voting integrated circuit), a digital signal processor (DSP) or an artificial intelligent (AI) engine 242, and I/O engines 244. The voting logic 240 may be implemented using a field-programmable gate array ("FPGA") of the processing device 210*c*. The voting logic 240 may be configured to receive the outputs from each of the processing devices 210 and to verify or validate the outputs to improve data reliability. The outputs of the processing devices 210 may correspond to the outputs of the first processing cores 234 (e.g., first processors) or the second processing cores 236 (e.g., second processors). The outputs of the processing devices 210 may include data, a command, a memory address or reference for a read or write operation, or a combination thereof. For example, each output of the processing devices 210 may include data for a write operation or a memory address for a read operation.

The voting logic 240 may receive the output of the processing device 210*a* via the communication bus 214 and may receive the output of the processing device 210*b* via communication bus 216. Further, the voting logic 240 may receive the output of the processing device 240*c* via internal circuitry (e.g., a network-on-chip (NoC) interconnect system) as further described below. Once the voting logic 240 receives the outputs from the processing devices 210, the voting logic 240 may perform a voting process to verify or validate the outputs (e.g., the outputs are correct or reliable). For example, the voting logic 240 may perform a voting process to produce a voted result as the result of voting among the outputs received from the processing devices 210.

In one implementation, when all of the outputs of the processing devices 210 match (e.g., all outputs have the same or identical value), the voting logic 240 may select one of the outputs of the processing devices 210 as the voted result. When the outputs of the processing devices 210 do not match each other, the voting logic 240 may be configured to "vote out" the faulty data, such as an output of an processing device 210 that is in disagreement with the other outputs of the processing devices 210. The outputs of the processing devices 210 may not match due to a fault or upset (e.g., SEU) in one or more of the processing devices 210 or in a memory device. In some implementations, the voting logic 240 may produce a voted result based on a majority of the outputs matching or being in agreement (e.g., at least two out of three outputs matching). For example, the voting logic 240 may produce a voting result according to the majority of the outputs of the processing devices 210. Once the voting logic 240 receives the outputs, the voting logic 240 may select one of the majority outputs of the processing devices 210 as a voted result. This voting scheme may applied sequentially for each output of the processing devices 210.

The fault tolerant computing system 200 may continue to operate if at least a majority of the outputs of the processing devices 210 are in agreement (e.g., equal to each other) and/or if only a minority (e.g., one) of the outputs of the processing devices 210 are different. Thus, the voting logic 240 may validate or verify the outputs of the processing devices 210 even when a fault or upset is present such that not all of the processing devices 210 are outputting identical data. However, if a majority of the outputs of the processing devices 210 are not in agreement, the voting logic 240 may not provide an output and may provide an interrupt or toggle signal to the processing devices 210 as further described below.

The voting logic 240 may detect or determine whether the outputs of the processing devices 210 match or are different by comparing the outputs that are received from each processing devices 210 with the outputs of each of the other processing devices 210. In some embodiments, the voting logic 240 may compare the outputs of the processing devices 210 on a bit by bit basis, with output equality occurring if and only if all the selected bits of one output are equal to the corresponding bits of the other outputs.

Once the voting logic 240 produces a voted result, the voting logic 240 may output the voted result for use by another component. In some implementations, the voted result may be communicated by the voting logic 240 to an I/O device over a backplane or the memory device 212. For example, for write operations, the voted result may be stored in the memory device 212 at a particular location and, for read operations, the voting logic 240 may read data from a particular location identified by the voted result.

Further, the voting logic 240 may include a timer to determine whether all processing devices 210 have provided an output within a particular time interval or window before performing voting among the outputs of the processing devices 210. For example, the voting logic 240 may verify or validate the outputs (e.g., correct or reliable) of the processing devices 210 when a majority of the outputs match or are in agreement (e.g., at least two out of three outputs match) and the outputs of the processing device 210 are received within the particular time interval. The voting logic 240 may start the timer upon receiving the output of one or the processing devices 210. Once the voting logic 240 has received all of the outputs within the time interval, the voting logic 240 may perform a voting process based on the outputs received from the processing devices 210. However, if the voting logic 240 does not receive one or more of the outputs of the processing devices 210 within the time interval, then the voting logic 240 may vote out the one or more outputs of the processing devices 210 (i.e., disregarded in the voting or comparison process) and then vote the remaining outputs.

Figure 4:
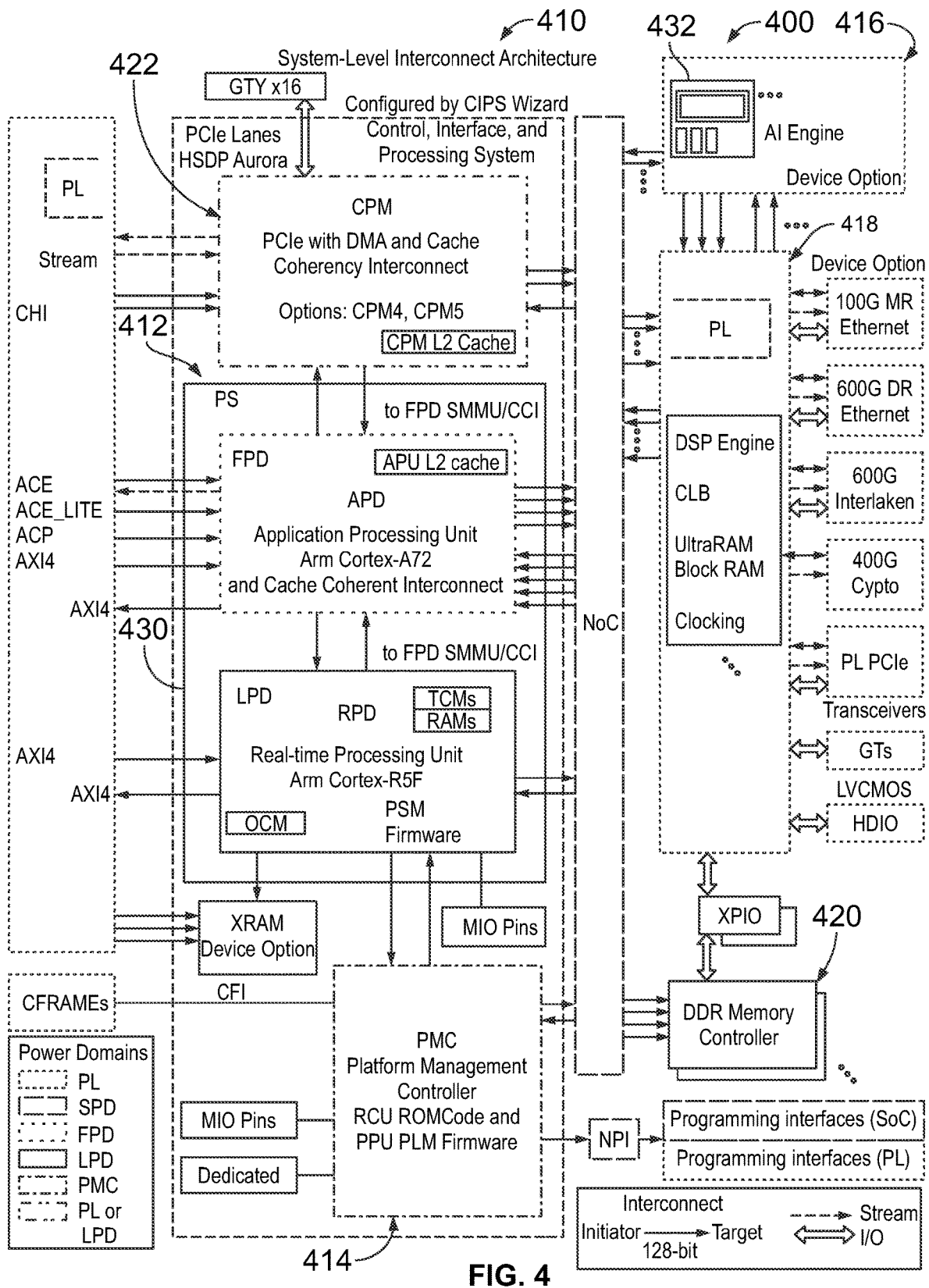
FIG. 4 illustrates a simplified block diagram of the architecture of another processing device, according to an exemplary embodiment.

An exemplary block diagram of an embodiment of the architecture of a processing device 400 having voting logic is shown in FIG. 4. In some embodiments, the architecture of the processing device 210*c* may be substantially similar to architecture of the processing device 400. Note that FIG. 4 is intended to illustrate only one possible example of the architecture of the processing device 400. In other implementations, a processing device may include different numbers of logic blocks as well as other types of blocks including input/output blocks, memory controller blocks, transceiver blocks, and the like.

The processing device 400 may include a network-on-chip (NoC) interconnect system 410, scalar engines 412, a platform management controller (PMC) 414, intelligent engines 416, adaptable engines 418, a double data rate (DDR) memory controller 420, a cache coherent interconnect (CPM) 422. In some implementations, the processing device 400 may be configured to implement the functionality associated with a system-on-a-chip (SoC).

The NoC interconnect system 410 may include any number of segments connected together to implement a high-speed, high-bandwidth programmable signal routing network that can selectively interconnect various device resources (such as the scalar engines 412, a platform management controller (PMC) 414, intelligent engines 416, adaptable engines 418, a double data rate (DDR) memory controller 420, and a cache coherent interconnect (CPM) 422) with each other and with other components not shown for simplicity. The NoC interconnect system 410 may be configured to exchange signals and data directly between any connected blocks, engines, resources, etc., without any intervening circuits or interfaces. For example, the NoC interconnect system 410 may be configured to transmit information between various device resources as data packets that can be individually addressed and routed from a source location to a destination location. In some aspects, the data packets transmitted on the NoC interconnect system 410 may be dynamically addressable.

The scalar engines 412 of the processing device 400 may include one or more processor cores 430. The processor cores 430 may be configured to perform any number of processing tasks including numeric and/or procedural processing tasks. In some embodiments, the processor cores 430 may include Advanced RISC Machine (ARM) cores, however other processor cores are possible. For example, the processing cores 440 may include a dual-core ARM cortex A72 Application Processing Unit (APU) and a dual core ARM cortex R5F Real-time Processing Unit (RPU). The RPU may be configured as a single/dual processor in lockstep mode.

The intelligent engines 416 of the processing device 400 may include one or more artificial intelligence (AI) engines 432. In other embodiments, the AI engines 432 may also include one or more DSP engines (not shown). The AI engines 432 may include any suitable number of AI inference engines that may be configured to perform any number of machine learning tasks. The DSP engine may include any suitable number of DSP processing cores that may be configured to perform any number of DSP tasks.

The adaptable engines 418 of the processing device 400 may include programmable logic cells and memory cells. The programmable cells and memory cells may be configured to implement programmable logic and/or FPGA designs as well as to form customized memory hierarchies for use within the processing device 400. The adaptable engines 418 may provide signal connections with one or more other devices or chips (not shown for simplicity) connected to the processing device 400. In some implementations, the adaptable engines 418 may include one or more circuits to enable high-speed data transfer to and from the processing device 400. By way of example and not limitation, the adaptable engines 418 may include one or more PCIe interfaces that interface with other processing devices, such as the processing devices 210*a* and 210*b* of FIG. 2, via a PCIe link with redundant controllers (not shown).

The DDR memory controller 420 may enable storage and retrieval of data for the processing device 400. In some implementations, the DDR memory controller memory 420 may interface with and control DDR memory circuits (not shown for simplicity). The PMC 414 of the processing device 400 may include a local controller (sometimes referred to as a root controller or root monitor, not shown for simplicity) to control operations of the processing device 400. Thus, the PMC 414 may include a configuration interface to receive a configuration bit stream and accordingly configure controlling registers within the processing device 400. The local controller may also control operations of an analog signal controller.

Referring again to FIG. 2, in operation, the processing devices 210 may perform redundant operations or transactions substantially in parallel with each other such that the outputs may be identical and may be output at substantially the same time. The voting logic 240 of the fault tolerant computing system 200 may receive the outputs from each of the processing devices 210 based on the operations or transactions performed by the processing devices 210 and may perform a voting process to verify or validate the outputs (e.g., deemed correct or reliable data). The voting logic 240 may perform the voting process to produce a voted result as the result of voting among the outputs received from the processing devices 210. In some embodiments, the outputs may correspond to instruction/data fetches, writes to memory, or a combination thereof.

The voting logic 240 may produce a voted result when at least a majority (e.g., at least two out of three) of the outputs of the processing devices 210 match and the outputs are received within a particular time interval or window. For example, the voting logic 240 may verify or validate the outputs of the processing devices 210 when all of the outputs are received within a particular time window and one of the following occurs: (1) all of the outputs of the processing devices 210 match or are identical; (2) the outputs of the processing device 210*a* and the processing device 210*b* match and the output of the processing device 210*c* does not match the outputs of the processing devices 210*a* and 210*b*; (3) the outputs of the processing device 210*a* and the processing device 210*c* match and the output of the processing device 210*b* does not match the outputs of the processing devices 210*a* and 210*c*; or (4) the outputs of processing device 210*b* and processing device 210*c* match and the output of the processing device 210*a* does not match the outputs of the processing devices 210*b* and 210*c*.

The voting logic 240 may produce a voting result according to the majority of the outputs of the processing devices 240. For example, the voting logic 240 may select one of the majority outputs as the voted result. The voting logic 240 may transmit the voted result to another component, such as the memory device 212 or an I/O engine 250 of the fault tolerant computing system 200.

The voting logic 240 may not produce a voted result (e.g., perform no action) if the outputs received from the processing devices 210 are voted invalid (e.g., deemed incorrect). For example, the voting logic 240 may suppress outputting any of the outputs of the processing device 210 if all of the outputs are considered incorrect or unreliable data (e.g., invalid or faulty). The outputs of the processing devices 210 may be invalid if a majority of the outputs (e.g., all three outputs) are different or at least one of the outputs is not received within a timing interval or window. In some embodiments, the voting logic 240 may vote to invalidate a minority output (e.g., deemed incorrect or unreliable data) when the minority output does not match the other outputs of the processing devices 210. As such, the voter logic may be configured to not produce a voted result and may issue an interrupt/reset signal or a toggle signal (e.g., switch to backup) to each of the processing devices 210. In response, the processing devices 210 may save state information and may restore execution to the operation being performed. Further, the processing devices 210 may be refreshed on a periodic schedule in the absence of voting mismatches to reduce the likelihood of double upsets.

Figure 5:
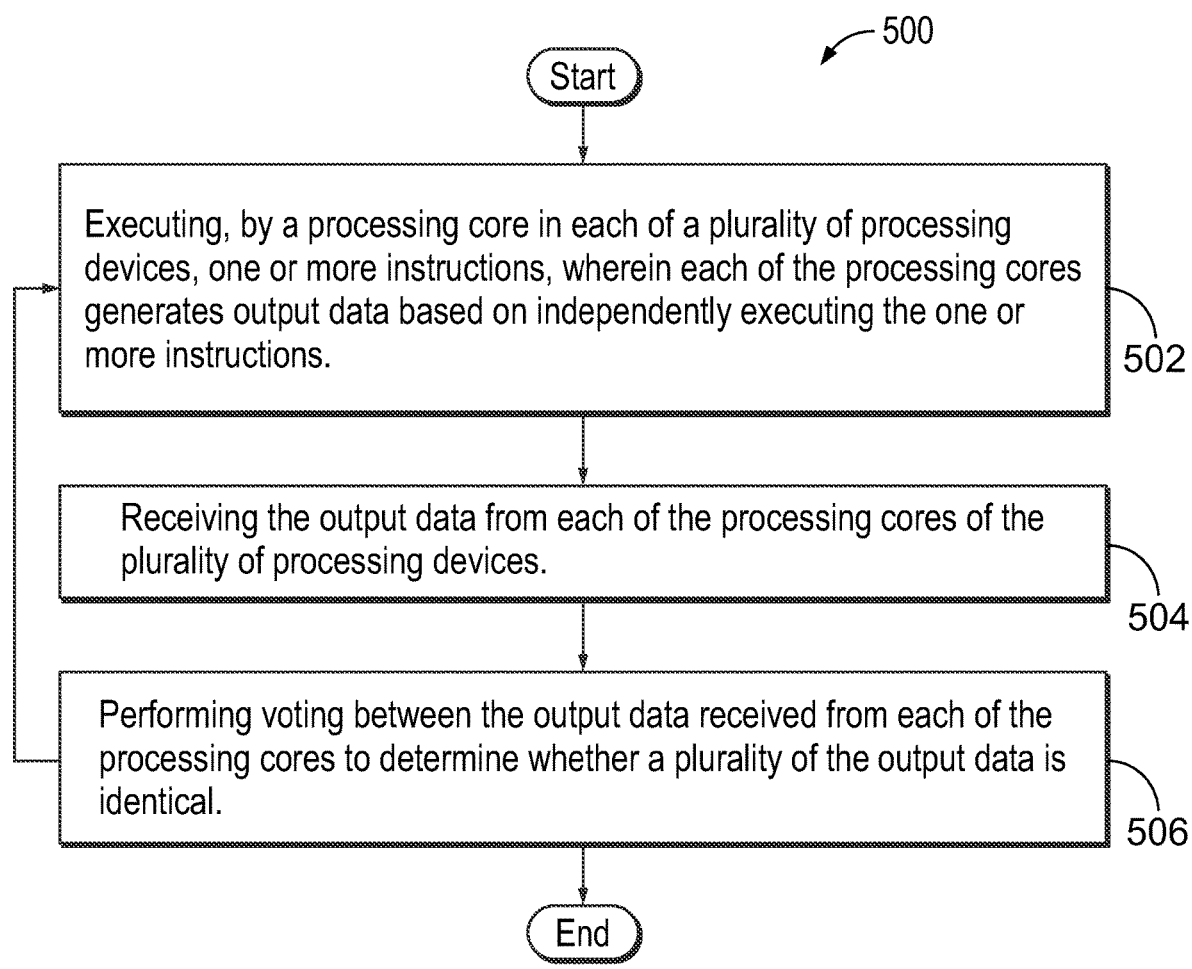
FIG. 5 is a flowchart of an example of an implementation of a method, according to an exemplary embodiment

FIG. 5 illustrates a flow chart of a method of processing outputs of computing system, according to an exemplary embodiment. The method 500 may include one or more operations, functions, or actions, as depicted by one or more of blocks 502-506, each of which may be carried out by any of the systems, methods, or apparatus shown in figures, among other possible systems. Alternative implementations are included within the scope of the example implementations of the present application in which operations, functions, or actions may be executed out of order from that shown or discussed, including substantially concurrent or in reverse order, depending on the functionality involved, as would be understood by those reasonably skilled in the art.

The method 500 may begin at block 502. The method 500 may include executing, by a processing core in each of a plurality of processing devices, one or more instructions, wherein each of the processing cores generates output data based on independently executing the one or more instructions. For example, a first processing core of each of a plurality of processing device may execute a sequence of instructions of application software. Each of the first processing cores may generate an output based on independently executing the same instructions (e.g., lockstep instructions). The processing devices may correspond to the processing devices 210 shown in FIG. 2 and each processing device may include one or more processing cores.

At block 504, the method may include receiving output data from each of the processing cores of the plurality of processing devices. The outputs may be received by a voting integrated circuit or voter logic. The voting integrated circuit may be part of one of the plurality of processing device. In some embodiments, the voting integrated circuit may be implemented using a field programmable gate array (FPGA).

At block 506, the method may include performing voting between the output data received from each of the processing cores to determine whether a plurality of the output data is identical. The voting integrated circuit may be configured to receive the output data from each of the processing devices. Once the voting integrated circuit receives the outputs from each of the processing devices, the voting integrated circuit may be configured to perform a voting process to verify or validate the outputs (e.g., deemed correct or reliable data). The voting integrated circuit may also determine whether the output data is received by the voting integrated circuit from the processing device within a predetermined time interval or window. The voting integrated circuit may perform the voting process to produce a voted result as the result of voting among the output data received from the processing devices. The voting integrated circuit may produce a voted result when at least a majority (e.g., at least two out of three) of the output data of the processing devices 210 match and the output data is received within a particular time interval or window. The voted result may include data from at least one of the majority of the output data of the plurality of processing devices. The voted result may be provided to a memory device, or an I/O device or engine.

Although the systems are described herein with specific reference to space systems or aerospace vehicles, in other embodiments, the system can be a vehicle other than a spacecraft without departing from the essence of the present disclosure.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A system that comprises:
a memory device configured to store instructions and data;
processing devices distinct from and in communication with the memory device, wherein each of the processing devices comprises respectively:
an internal cache memory;
an adaptable engine that comprises programmable logic configured to form customized memory hierarchies within each of the processing devices;
more than one dual processing cores, wherein at least a first dual processing core, respectively in each processing device is configured to execute advanced reduced instruction set computing of the instructions at independent rates aligned on a transactional step basis;
a peripheral component interconnect express bus restricted to communications with a voting integrated circuit coupled to the memory device, wherein the voting integrated circuit is configured to receive, respectively output data from a transaction on each of the processing devices and to vote between the output data; and
determine whether a plurality of the output data is identical, wherein the voting integrated circuit is implemented in a field programmable gate array (FPGA).

2. The system according to claim 1, wherein the output data comprises one of a command to be executed by the system, an address associated with the memory device, data to be written to the memory device, data to be provided to an I/O device, or a combination thereof.

3. The system according to claim 1, wherein:
the voting integrated circuit is further configured to compare output of the processing devices on a bit by bit basis; and
the plurality of processing devices includes at least three processing devices.

4. The system according to claim 1, wherein a processing core of one of the processing devices is configured to execute the instructions identically to corresponding processing cores in each of the other processing devices, and wherein each of the processing cores operates on an independent clock during execution of the instructions.

5. The system according to claim 1, wherein determining whether the output data of each of the plurality of processing devices is identical includes comparing the output data of each of the processing devices to the output data of the other processing devices.

6. The system according to claim 1, wherein each of the plurality of processing devices is configured to be aligned based on each redundant transaction performed by each of the plurality of processing devices and to operate asynchronously between voting.

7. The system according to claim 1, wherein;
the peripheral component interconnect express bus comprises four lanes with redundant controllers; and
the voting integrated circuit is further configured to provide a voted result when a majority of the output data of the plurality of processing devices is identical.

8. The system according to claim 7, wherein the voted result is provided to one of the memory device, an I/O device, or a combination thereof.

9. The system according to claim 7, wherein the voted result includes data from at least one of the majority of the output data of the plurality of processing devices.

10. The system according to claim 1, wherein the voting integrated circuit is further configured to disregard output data received beyond a particular period of time that commences upon the voting integrated circuit receiving a first output.

11. The system according to claim 1, wherein the one or more processing cores of each of the plurality of processing devices includes a first processing core and a second processing core, wherein the output data of each of the plurality of processing devices is generated by the first processing core or the second processing core.

12. The system according to claim 1, wherein a second dual processing core is a real time processing unit configured in lockstep mode.

13. The system according to claim 1, wherein the voting integrated circuit is included in a first processing device of the plurality of processing devices.

14. The system according to claim 13, wherein the voting integrated circuit is configured to receive the output data generated by the first processing device via a network.

15. The system according to claim 13, further comprising:
a second processing device of the plurality of processing devices coupled to the first processing device; and
a third processing device of the plurality of processing devices coupled to the first processing device.

16. A method for preventing propagation of a single event upset, due to radiation exposure, through an electronic system, the method comprising:
storing one or more instructions in a memory device distinct from and in communication with a plurality of processing devices;
executing, by a processing core in each of the plurality of processing devices, the one or more instructions;
each processing core, respectively generating output data by independently executing the one or more instructions, wherein at least one processing core in each processing device is a dual core processor configured to execute advanced reduced instruction set computing of the instructions at independent rates aligned on a transactional step basis;

receiving, at a voting integrated circuit, the output data from each of the processing cores of the plurality of processing devices through, respectively, a peripheral component interconnect express bus dedicated to communicating between the processing core and the voting integrated circuit; and performing, at the voting integrated circuit, voting between the output data received from each of the processing cores to determine whether a plurality of the output data is identical.

17. The method according to claim 16, wherein determining whether the output data is identical further includes comparing each of the output data with output data from another processing core.

18. The method according to claim 16, further comprising:

producing a voted result when a majority of the output data of the processing core is identical; and the voting integrated circuit is further configured to disregard output data received beyond a particular period of time that commences upon the voting integrated circuit receiving a first output.

19. The method according to claim 16, further comprising storing a voted result in a memory device when a majority of the output data of the processing cores is identical, and wherein the voted result includes data from one of the majority of the output data of the processing cores.

20. A non-transitory computer-readable medium that comprises stored instructions thereon, wherein the instructions are configured for execution by processing devices configured to prevent propagation of single event upsets, due to radiation exposure, through electronic equipment, by execution of operations that comprise:

storing application instructions on a memory device distinct from the processing devices;

executing one or more of the application instructions on each of the processing devices;

generating output data for each of the processing devices based on the execution of the one or more application instructions via at least a first dual processing core respectively in each processing device executing advanced reduced instruction set computing of the application instructions at independent rates aligned on a transactional step basis;

each processing device communicating, respectively through a peripheral component interconnect express bus with a voting integrated circuit coupled to the memory device;

the voting integrated circuit performing a voting process between the output data; and producing a result, based on the voting process, when a majority of the output data of the processing devices is identical.

* * * * *

UNITED STATES PATENT AND TRADEMARK OFFICE
CERTIFICATE OF CORRECTION

| | | |
|---|---|---|
| PATENT NO. | : 12,306,663 B2 | Page 1 of 1 |
| APPLICATION NO. | : 18/189963 | |
| DATED | : May 20, 2025 | |
| INVENTOR(S) | : Bruce A. Boettjer et al. | |

It is certified that error appears in the above-identified patent and that said Letters Patent is hereby corrected as shown below:

In the Specification

Column 8, Line 56, correct "first processing cores 234" to read -- second processing cores 236 --;
Column 8, Line 57, correct "each first processing core 234" to read -- each of second processing cores 236 --;

In the Claims

Column 16, Line 19, correct "wherein;" to read -- wherein: --.

Signed and Sealed this
Twenty-fourth Day of June, 2025

Coke Morgan Stewart
*Acting Director of the United States Patent and Trademark Office*